US011402504B2

(12) United States Patent
Holbek et al.

(10) Patent No.: US 11,402,504 B2
(45) Date of Patent: Aug. 2, 2022

(54) 3-D IMAGING AND/OR FLOW ESTIMATION WITH A ROW-COLUMN ADDRESSED 2-D TRANSDUCER ARRAY

(71) Applicant: B-K Medical Aps, Herlev (DK)

(72) Inventors: Simon Holbek, Fredericksberg (DK); Hamed Bouzari, Copenhagen (DK); Jonas Jensen, Copenhagen (DK); Matthias Bo Stuart, Horsholm (DK); Mathias Engholm, Copenhagen (DK); Erik Vilain Thomsen, Lynge (DK); Jorgen Arendt Jensen, Horsholm (DK)

(73) Assignee: BK Medical APS, Herlev (DK)

( * ) Notice: Subject to any disclaimer, the term of this patent is extended or adjusted under 35 U.S.C. 154(b) by 532 days.

(21) Appl. No.: 16/348,291

(22) PCT Filed: Nov. 11, 2016

(86) PCT No.: PCT/IB2016/056817
§ 371 (c)(1),
(2) Date: May 8, 2019

(87) PCT Pub. No.: WO2018/087584
PCT Pub. Date: May 17, 2018

(65) Prior Publication Data
US 2020/0064468 A1      Feb. 27, 2020

(51) Int. Cl.
*G01S 15/00*      (2020.01)
*G01S 15/89*      (2006.01)

(52) U.S. Cl.
CPC ........ *G01S 15/8977* (2013.01); *G01S 15/892* (2013.01); *G01S 15/8925* (2013.01);
(Continued)

(58) Field of Classification Search
USPC ............................................................ 367/7
See application file for complete search history.

(56) References Cited

U.S. PATENT DOCUMENTS 8,323,201 B2 * 12/2012 Towfiq ................ A61B 8/4483
                                                           600/459
9,855,022 B2 *  1/2018 Christiansen ....... G01S 15/8979
(Continued)

FOREIGN PATENT DOCUMENTS

WO      WO-2017212313 A1 * 12/2017 ......... G01S 15/8913

OTHER PUBLICATIONS

International Search Report for PCT/IB2016/056817 published as WO 2018/087584 dated May 17, 2018.
(Continued)

*Primary Examiner* — James R Hulka
(74) *Attorney, Agent, or Firm* — Daugherty & Del Zoppo, Co. LPA

(57) ABSTRACT

An ultrasound imaging system (100) includes a 2-D transducer array (102) with a first 1-D array (104, 204) of one or more rows of transducing elements (106, $204_1$, . . . $204_6$) configured to produce first ultrasound data and a second 1-D array (104, 206) of one or more columns of transducing elements (106, $206_1$, . . . $206_6$) configured to produce second ultrasound data. The first and second 1-D arrays are configured for row-column addressing. The ultrasound imaging system further includes a controller (112) configured to control transmission and reception of the first and second 1-D arrays, and a beamformer (114) configured to beamform the received first and second echoes to produce ultrasound data, and an image processor (116) configured to process the ultrasound data to generate an image, which is displayed via a display (224).

26 Claims, 6 Drawing Sheets

(52) U.S. Cl.
  CPC ...... *G01S 15/8927* (2013.01); *G01S 15/8984* (2013.01); *G01S 15/8993* (2013.01); *G01S 15/8997* (2013.01)

(56) References Cited

U.S. PATENT DOCUMENTS

| | | | | |
|---:|---|---|---|---|
| 10,859,696 | B2* | 12/2020 | Bouzari | G01S 15/8913 |
| 2008/0221454 | A1* | 9/2008 | Davidsen | A61B 8/483 |
| | | | | 600/459 |
| 2009/0043206 | A1* | 2/2009 | Towfiq | A61B 8/5253 |
| | | | | 600/447 |
| 2010/0063397 | A1* | 3/2010 | Wagner | A61B 8/4494 |
| | | | | 600/459 |
| 2011/0071395 | A1* | 3/2011 | Miller | G01S 15/8925 |
| | | | | 600/439 |
| 2015/0087991 | A1* | 3/2015 | Chen | G01S 7/52033 |
| | | | | 600/459 |
| 2015/0245814 | A1* | 9/2015 | Towfiq | G01S 15/8993 |
| | | | | 600/459 |
| 2016/0206285 | A1 | 7/2016 | Christiansen et al. | |
| 2018/0003819 | A1* | 1/2018 | Koptenko | G01S 15/8927 |
| 2019/0083064 | A1* | 3/2019 | Nguyen | A61B 8/54 |
| 2019/0302256 | A1* | 10/2019 | Bouzari | B06B 1/0622 |

OTHER PUBLICATIONS

Christiansen, et al., 3-D Imaging Using Row-Column-Addressed Arrays with Integrated Apodization Part II: Transducer Fabrication and Experimental Results, IEEE Transactions on Ultrasonics, Ferroelectrics and Frequency Control, vol. 62, No. 5, May 2015.

Rasmussen, et al., 3-D Imaging Using Row-Column-Addressed Arrays with Integrated Apodization Part I: Apodization Design and Line Element Beamforming, IEEE Transactions on Ultrasonics, Ferroelectrics and Frequency Control, vol. 62, No. 5, May 2015.

Holbek, et al., 3-D Vector Flow Estimation with Row-Column-Addressed Arrays, IEEE Transactions on Ultrasonics, Ferroelectrics and Frequency Control, vol. 63, No. 11, Nov. 2016.

Bouzari, et al., Volumetric Synthetic Aperture Imaging with a Piezoelectric 2-D Row-Column Probe, Medical Imaging 2016: Ultrasonic Imaging and Tomography, edited by Neb Durie, Brecht Heyde, Proc. of SPIE vol. 9790, 2016.

* cited by examiner

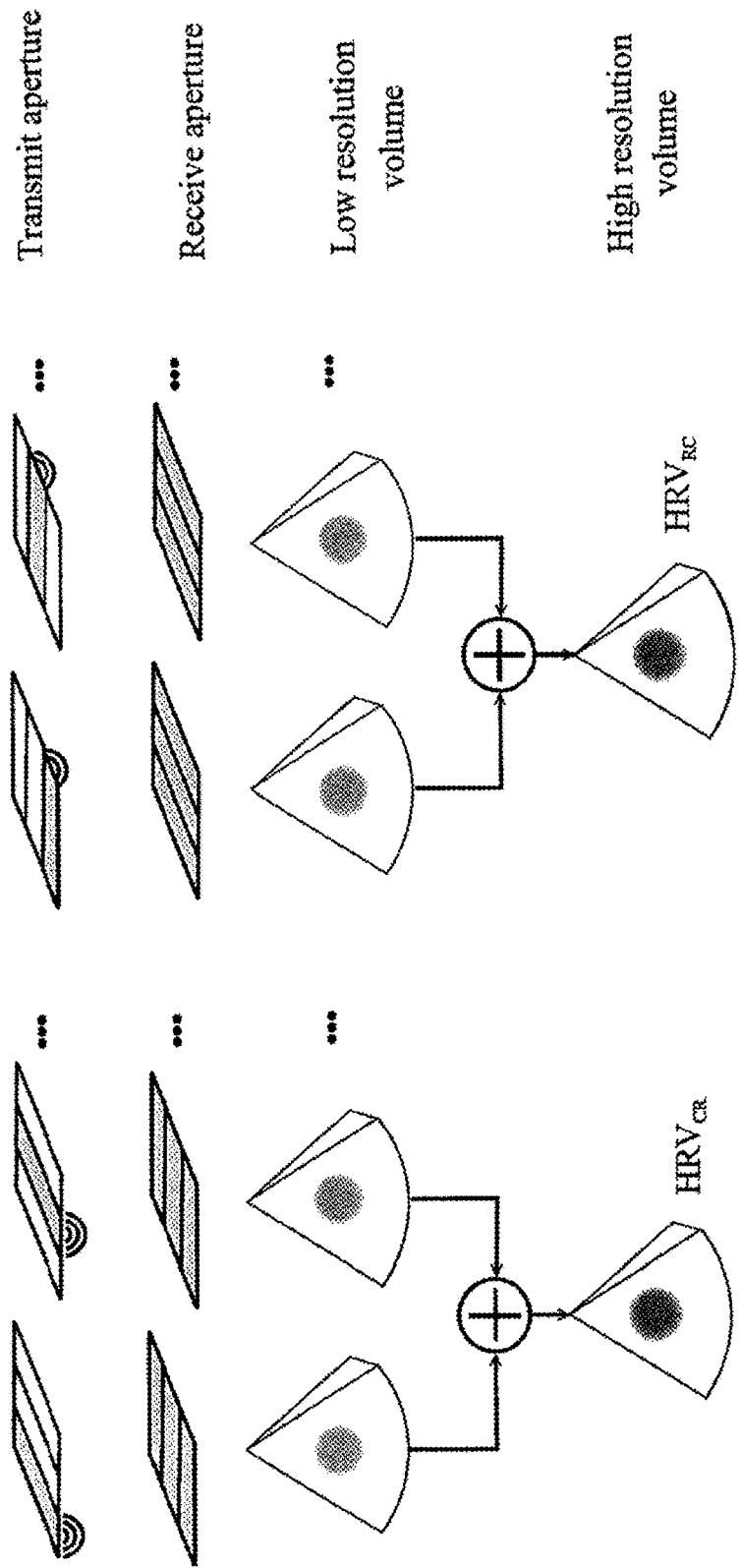
FIGURE 11
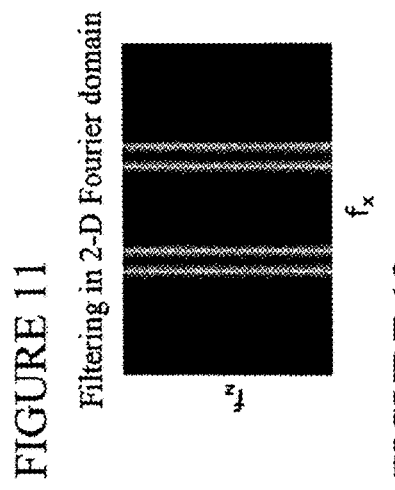
FIGURE 12
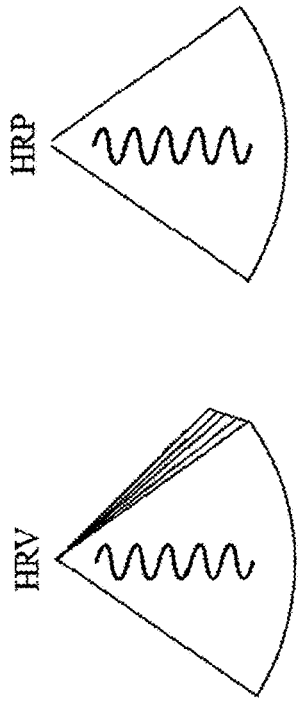

3-D IMAGING AND/OR FLOW ESTIMATION WITH A ROW-COLUMN ADDRESSED 2-D TRANSDUCER ARRAY

RELATED APPLICATION

This application is a national filing of PCT application Serial No. PCT/IB2016/056817, filed Nov. 11, 2016, published as WO2018/087584 on May 17, 2018. This application claims priority to PCT application Serial No. PCT/IB2016/056817, published as WO2018/087584 on May 17, 2018.

TECHNICAL FIELD

The following generally relates to ultrasound imaging and more particularly to three-dimensional (3-D) imaging with a row-column addressed 2-D transducer array and/or flow estimation with a row-column addressed 2-D transducer array.

BACKGROUND

For 3-D imaging with a two-dimensional (2-D) array of transducing elements, the elements can be individually addressed or group-wise addressed, e.g., using row-column addressing, where groups of elements are accessed either by a row index or a column index such that each row and column is utilized as a single larger element. With traditional row-column addressing, the row and column arrays each steer the transmit and receive beams in one direction. However, the transmit and receive directions are orthogonal to each other. For example, when the row array is used as a transmit array, it can steer the transmit angle in the z-x plane while at the same time the column array receives in the z-y plane. When the sequence is complete, the two arrays switch function, and now the column array is used as a transmit array and the row array as a receive array. This leads to two identical volumes; however, at each point only one-way focusing in transmit and receive is achievable. Three-dimensional vector flow has been implemented with a row and column array in a single plane as described in Christiansen et al., Ser. No. 14/599,857, filed January 2015, and entitled "3-D flow estimation using row-column addressed transducer arrays," which is incorporated herein by references in its entirety. Unfortunately, the lack of two-way focusing and limitations with only 3-D vector flow in a plane render traditional row-column addressing not well-suited for real-time volumetric 3-D vector flow imaging. In view of at least the above, there is an unresolved need for another approach for 3-D imaging with a row-column addressed transducer array and/or flow estimation with a row-column addressed transducer array.

SUMMARY

Aspects of the application address the above matters, and others.

In one aspect, an ultrasound imaging system includes a 2-D transducer array with a first 1-D array of one or more rows of transducing elements configured to produce first ultrasound data and a second 1-D array of one or more columns of transducing elements configured to produce second ultrasound data. The first and second 1-D arrays are configured for row-column addressing. The ultrasound imaging system further includes a controller configured to control transmission and reception of the first and second 1-D arrays, and a beamformer configured to beamform the received first and second echoes to produce ultrasound data, and an image processor configured to process the ultrasound data to generate an image, which is displayed via a display.

In another aspect, a method includes controlling transmission and reception of first and second 1-D arrays of a 2-D transducer array, wherein the first 1-D array includes one or more rows of transducing elements configured to produce first ultrasound data, and the second 1-D array includes one or more columns of transducing elements configured to produce second ultrasound data, wherein the first and second 1-D arrays are configured for row-column addressing, beamforming the received first and second echoes to produce ultrasound data, and processing the ultrasound data to generate an image, which is displayed via a display.

In another aspect, a computer readable medium is encoded with non-transitory computer executable instructions which when executed by a processor causes the processor to: control transmission and reception of first and second 1-D arrays of a 2-D transducer array, wherein the first 1-D array includes one or more rows of transducing elements configured to produce first ultrasound data, and the second 1-D array includes one or more columns of transducing elements configured to produce second ultrasound data, wherein the first and second 1-D arrays are configured for row-column addressing, and at least one of beamform the received first and second echoes to produce ultrasound data with two-way focusing in elevation or process the received first and second echoes to estimate volumetric 3-D vector flow information.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which:

FIG. 11 schematically illustrates single element transmission synthetic aperture imaging;

FIG. 12 schematically illustrates processing of the output of the single element transmission synthetic aperture imaging of FIG. 11;

FIG. 13 schematically illustrates row-column steered sequence for 3-D vector flow obtained in a cross sectional plane with TO; and FIG. 14 schematically illustrates row-column steered sequence for volumetric 3-D vector flow with TO.

DETAILED DESCRIPTION

The following describes an approach to achieve two-way focusing in elevation with data acquired with a 2-D row-column addressed array and/or estimate vector flow information with data acquired with the 2-D row-column addressed array.

Figure 1:
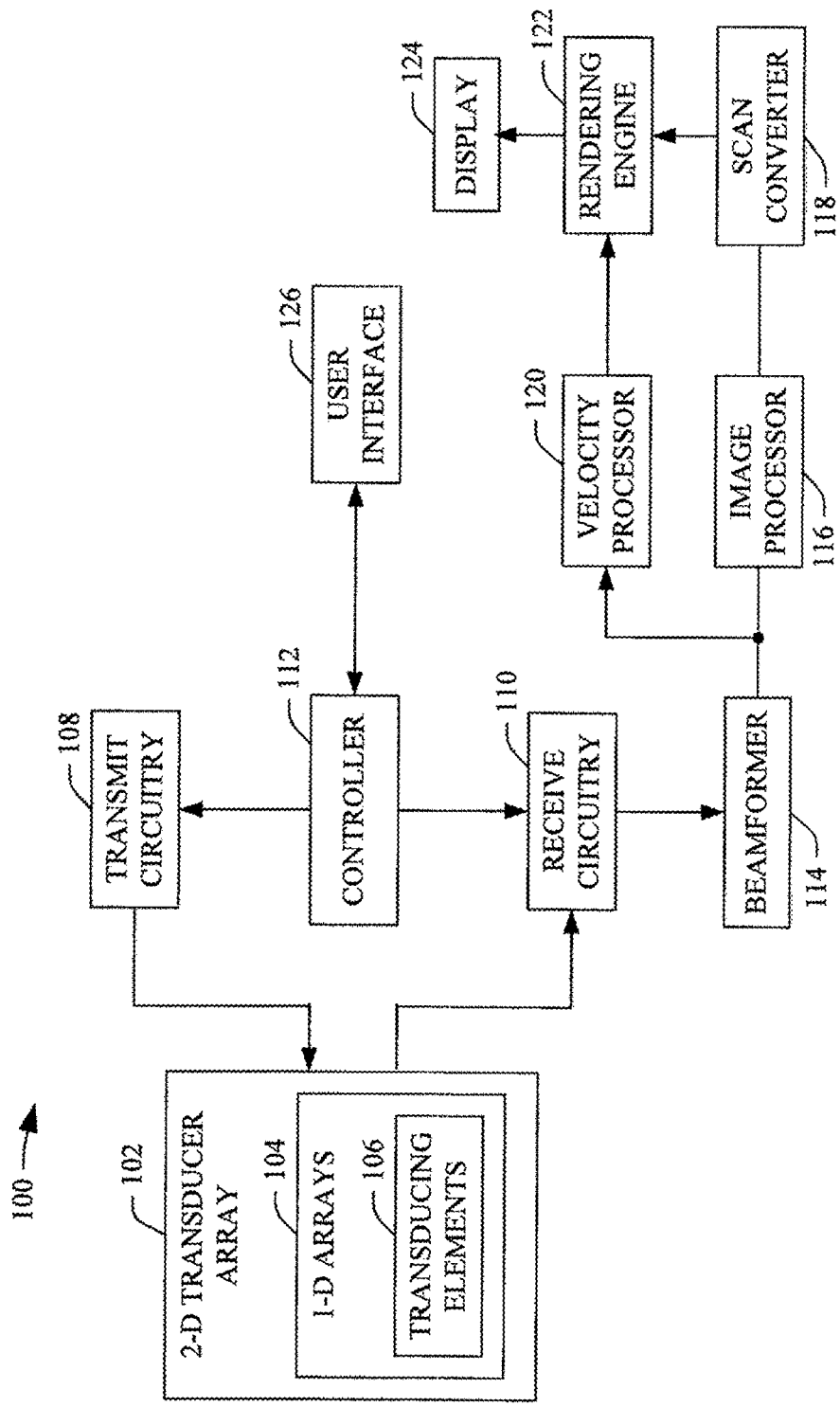
FIG. 1 schematically illustrates an example imaging system with a 2-D row-column addressed array.
Figure 2:
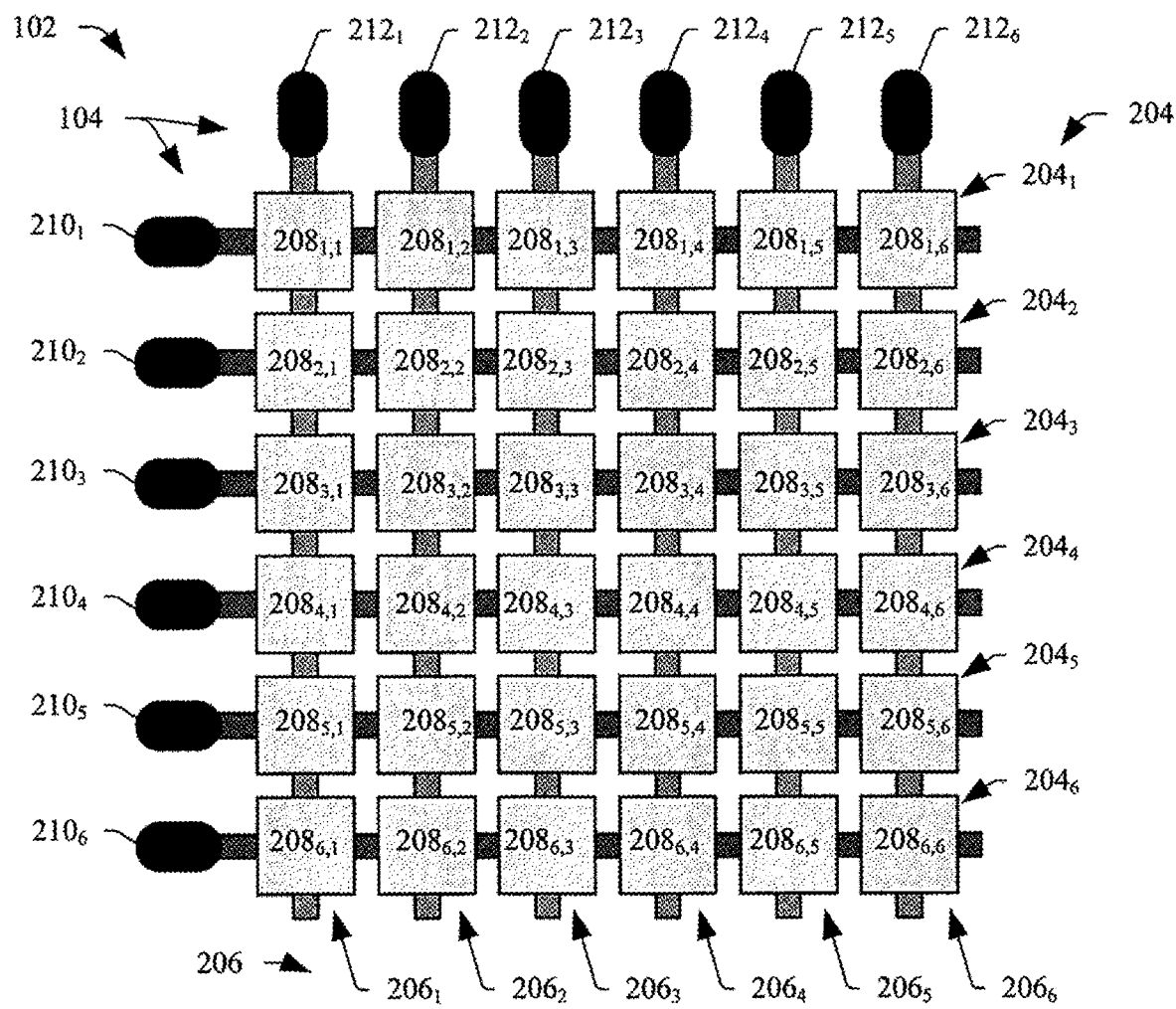
FIG. 2 schematically illustrates an example of the 2-D row-column addressed array.

FIG. 1 schematically illustrates an example ultrasound imaging system 100. The ultrasound imaging system 100 includes a 2-D transducer array 102 with at least two one-dimensional (1-D) arrays 104 of transducing elements 106 where the 1-D arrays 104 are arranged orthogonal with respect to each other. The 2-D transducer array 102 includes N rows (or columns) and M columns (or rows) of the transducing elements 106, where N and M are positive integers and N=M or N≠M. The 2-D transducer array 102 may include a 16×16, 32×32, 64×64, 128×128, 512×512 larger or smaller array, a non-square/rectangular array, a circular array, and/or another 2-D transducer array. FIG. 2 illustrates an example of the 2-D transducer array 102.

Figure 3:
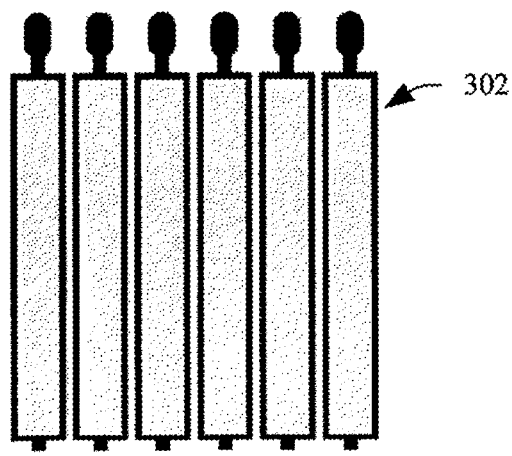
FIG. 3 schematically illustrates an example of an effective 1-D column array resulting from the row-column addressing with the 2-D row-column addressed array.
Figure 4:
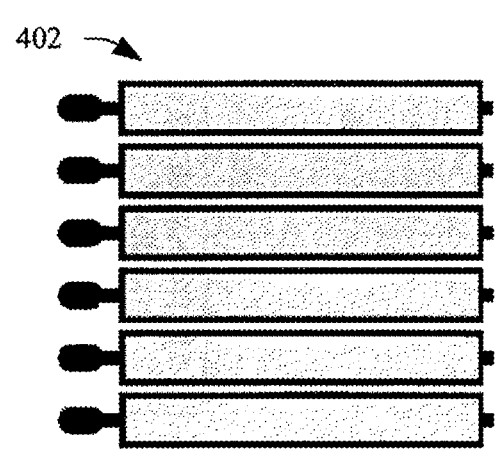
FIG. 4 schematically illustrates an example of an effective 1-D row array resulting from the row-column addressing with the 2-D row-column addressed array.

In FIG. 2, the 2-D transducer array 102 is 6×6 array (N=M=6). The 2-D array 102 includes a plurality of rows $204_1$, $204_2$, $204_3$, $204_4$, $204_5$, and $204_6$, collectively referred to herein as rows 204. The 2-D array 102 also includes a plurality of columns $206_1$, $206_2$, $206_3$, $206_4$, $206_5$, and $206_6$, collectively referred to herein as columns 206. The rows 204 and columns 206 include individual elements $208_{1,1}$, ..., $208_{1,6}$, ... $208_{6,1}$, ... $208_{6,6}$, collectively referred to herein as elements 208. The individual rows 204 and columns 206 are addressable (individually or in groups) respectively through contacts $210_1$, $210_2$, $210_3$, $210_4$, $210_5$, and $210_6$, and $212_1$, $212_2$, $212_3$, $212_4$, $212_5$, and $212_6$, collectively referred to as row contacts 210 and column contacts 212. Row-column addressing effectively transforms the 36-element 2-D array 102 into a six-element, 1-D column array 302 (FIG. 3) and a six-element, 1-D row array 402 (FIG. 4). The axial direction is along the beam direction, the azimuth direction is orthogonal to the axial direction and along the transmitting elements, and the elevation direction is orthogonal to the azimuth and axial directions.

Returning to FIG. 1, the transducing elements 106 may include piezoelectric, capacitive micromachined ultrasonic transducer (CMUT), and/or other elements. Furthermore, the transducing elements 106 may include integrated apodization, which may be identical or different for the individual elements. An example is described in patent application PCT/IB2013/002838, filed Dec. 19, 2013, and entitled "Ultrasound Imaging Transducer Array with Integrated Apodization," the entirety of which is incorporated herein by reference. Furthermore, the 2-D array 102 may have flat 1-D arrays, one curved 1-D array, two curved 1-D arrays, a single curved lens in front of or behind one of the 1-D arrays, a double curved lens in front of or behind the 1-D arrays, a combination of at least one curved 1-D array and at least one curved lens, etc. An example is described in patent application PCT/IB2016/053367, filed Jun. 8, 2016, and entitled "Row-Column Addressed 2-D array with a Double Curved Surface," the entirety of which is incorporated herein by reference.

Transmit circuitry 108 generates pulses that excite a predetermined set of addressed 1-D arrays of the 2-D array 102 to emit one or more ultrasound beams or waves, e.g., into a scan field of view. Receive circuitry 110 receives echoes or reflected waves, which are generated in response to the transmitted ultrasound beam or wave interacting with (stationary and/or flowing) structure in the scan field of view, from a predetermined set of addressed arrays of the 2-D array 102. A controller 112 controls the transmit circuitry 108 and/or the receive circuitry 108. Examples of control include: 1) transmitting and receiving with row elements, 2) transmitting and receiving with column elements, 3) transmitting with row elements and receiving with column elements, 4) transmitting with column elements and receiving with row elements, 5) transmitting with row elements and receiving with row and column elements, 6) transmitting with column elements and receiving with row and column elements, 7) transmitting with row elements and receiving with row and column elements and transmitting with column elements and receiving with row and column elements, etc.

As described in greater detail below, the controller 112 can control the transmit and receive circuitries 108 and 110 to acquire data to create a two-way focusing profile in elevation in the transmit direction. This can be achieved, for example, by controlling the transmit and receive circuitries 108 and 110 to transmit and receive with both rows and columns (example 7 above). This approach improves spatial resolution relative to traditional row-column addressing. As a result, relative to traditional row-column addressing, the size of the array can be maintained to yield the full spatial resolution improvement, the size of the array can be reduced while still yielding improved spatial resolution, and/or the size of the array can be reduced to maintain a particular resolution. For example, to maintain a particular resolution, the size of the array in each dimension can be reduced by a factor of 2 relative to traditional row-column addressing.

A beamformer 114 processes the echoes, for example, by applying time delays, weighting on the channels, summing, and/or otherwise beamforming received echoes, producing data for generating images in A-mode, B-mode, Doppler, and/or other ultrasound imaging modes. An image processor 116 processes the beamformed data. For B-mode, this may include generating a sequence of focused, coherent echo samples along focused scanlines of a scanplane. The image processor 116 may also be configured to process the scanlines to lower speckle and/or improve specular reflector delineation via spatial compounding, apply filtering such as FIR and/or IIR, etc. A scan converter 118 scan converts the output of the image processor 116 and generates data for display, for example, by converting the data to the coordinate system of the display. The scan converter 118 can be configured to employ analog and/or digital scan converting techniques.

The illustrated embodiment further includes a velocity processor 120. In a variation, the velocity processor 120 is omitted and/or is located remote from the imaging system 100, such as in a computing device such as a computer or the like, which is remote from and not part of the imaging system 100. The illustrated velocity processor 120 is configured to process the beamformed row-column addressed data to determine 3-D velocity components. As described in greater detail below, this may include estimating 3-D velocity components from unfocussed diverging waves in combination with synthetic aperture (SA) and directional transverse oscillation (DTO), which yields higher volume rates, estimating 3-D velocity components from focused emissions and TO, and/or estimating 2-D and/or 3-D velocity components using DTO, which yields higher spatial resolution.

Other methods could be transmission of plane waves and using a velocity estimator based on speckle tracking, e.g., Bohs et al., "Speckle tracking for multi-dimensional flow estimation," 2000, vol. 38, or vector Doppler techniques.

A rendering engine 122 visually presents one or more of the images and/or the velocity information via a display monitor 124. In one instance, the data is visually displayed in an interactive graphical user interface (GUI), which allows the user to selectively rotate, scale, and/or manipulate the displayed data through a mouse, a keyboard, touch-screen controls, etc. A user interface 126 includes one or more input devices (e.g., a button, a knob, a slider, a touch pad, etc.) and/or one or more output devices (e.g., a display screen, lights, a speaker, etc.). The user interface 126 can be used to select an imaging mode such as row-column addressing with two-way focusing in elevation and/or 3-D velocity component estimation, e.g., using one or more of the 3-D velocity component estimation approaches described herein.

In one instance, the transducer array 102 is part of a probe and the transmit circuitry 108, the receive circuitry 110, the controller 112, the beamformer 114, the image processor 116, the scan converter 118, the velocity processor 120, the rendering engine 122, the display 124, and the user interface 126 are part of a separate console such as a computing system. Communication there between can be through a wired (e.g., a cable and electro-mechanical interfaces) and/or wireless communication channel. In this instance, the console can be similar to a portable computer such as a laptop, a notebook, etc., with additional hardware and/or software for ultrasound imaging. The console can be docked to a docketing station and used.

Alternatively, the console can be part (fixed or removable) of a mobile or portable cart system with wheels, casters, rollers, or the like, which can be moved around. In this instance, the display 124 may be separate from the console and connected thereto through a wired and/or wireless communication channel. Where the cart includes a docking interface, the laptop or notebook computer type console can be interfaced with the cart and used. An example of a cart system where the console can be selectively installed and removed is described in US publication 2011/0118562 A1, entitled "Portable ultrasound scanner," and filed on Nov. 17, 2009, which is incorporated herein in its entirety by reference.

Alternatively, the transducer array 102, the transmit circuitry 108, the receive circuitry 110, the controller 112, the beamformer 114, the image processor 116, the scan converter 118, the velocity processor 120, the rendering engine 122, the display 124, and the user interface 126 are housed within a hand-held ultrasound apparatus, where the housing mechanically supports and/or encloses the components therein. In this instance, the transducer array 102 and/or the display 124 can be part of the housing, being structurally integrated or part of a surface or end of the hand-held ultrasound apparatus. An example of a hand-held device is in U.S. Pat. No. 7,699,776, entitled "Intuitive Ultrasonic Imaging System and Related Method Thereof," and filed on Mar. 6, 2003, which is incorporated herein in its entirety by reference.

As briefly discussed above, in one non-limiting instance, the controller 112 controls the transmit circuitry 108 and the receive circuitry 110 to acquire data to create a two-way focusing profile in elevation in the transmit direction. For this, the controller 112 controls the transmit circuitry 108 and the receive circuitry 110 to transmit with row elements and receive with both row and column elements and then transmit with column elements and receive with both row and column elements, or vice versa, i.e. transmit with column elements and receive with both row and column elements and then transmit with row elements and receive with both row and column elements.

Where the transmit and receive elements are the same (i.e. both rows, or both columns), the acquired data is used for two-way focusing in elevation, e.g., at least because the transmit and receive focus lines are both in the same plane. Where the transmit and receive elements are perpendicular to each other (i.e. rows and columns, or columns and rows), the acquired data is used to focus along each transmit focus line with only one-way focusing in elevation. The beamformer 114 beamforms the received echo signals, producing two volumes, a one for transmitting with row elements and receiving the echoes with both row and column elements, and another for transmitting with column elements and receiving the echoes with both row and column elements, both with a two-way focusing profile in elevation in transmit and a one-way profile in receive.

These two volumes are combined to produce a volume with a two-way focusing profile in elevation in the transmit direction. In one instance, the two volumes are combined by multiplying them and taking the square root. In general, this approach is well suited for static or moving tissue, e.g. at least because it is not very sensitive to movement. In another instance, the two volumes are combined by summing phase coherent signals. This approach is also well suited for static or moving tissue, although it may be more sensitive to movement. In another instance, the two volumes are combined by taking a minimum value of an absolute value of the two volumes at each point in space. These approaches create a two-way focusing profile in elevation in the transmit direction, which increases spatial resolution in both dimensions, relative to traditional row-column addressing where orthogonal arrays (row and column, or column and row) are used to transmit and receive. In general, the spatial resolution in the perpendicular dimension is improved by using the two-way focusing profile for each point along the transmit focus-line instead of the one-way beam profile.

Figure 5:
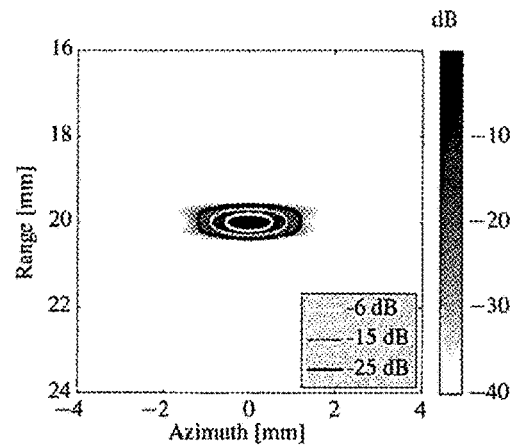
FIG. 5 depicts a point spread function for the azimuth direction in accordance with an embodiment herein.
Figure 6:
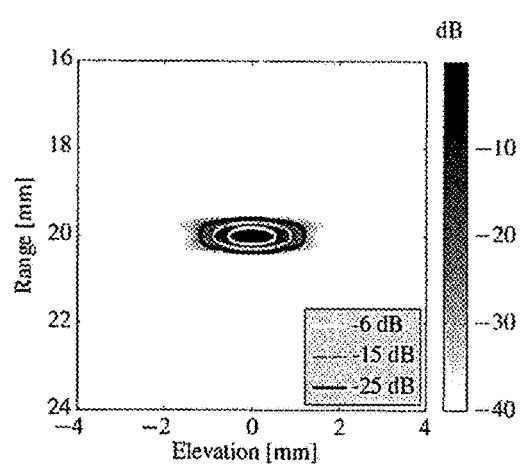
FIG. 6 depicts a point spread function for the elevation direction in accordance with an embodiment herein.
Figure 7:
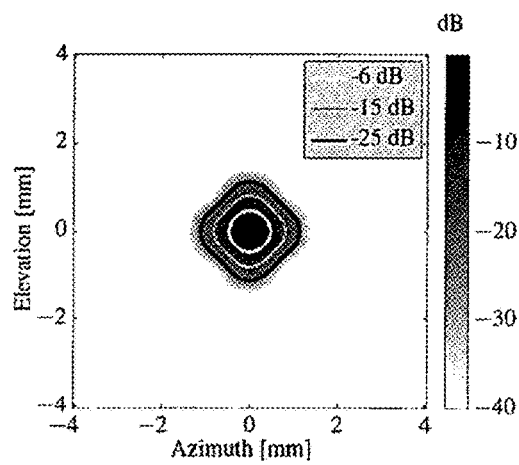
FIG. 7 depicts a point spread function for elevation versus azimuth in accordance with an embodiment herein.
Figure 8:
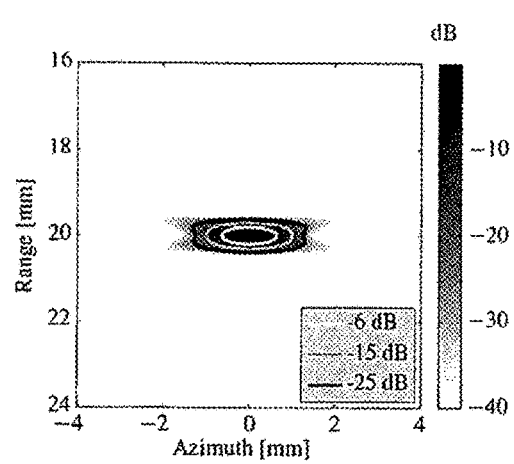
FIG. 8 depicts a point spread function for the azimuth direction for traditional row-column addressing.
Figure 9:
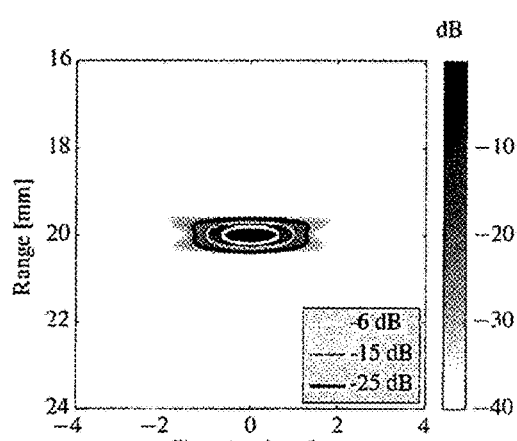
FIG. 9 depicts a point spread functions for the elevation direction for traditional row-column addressing.
Figure 10:
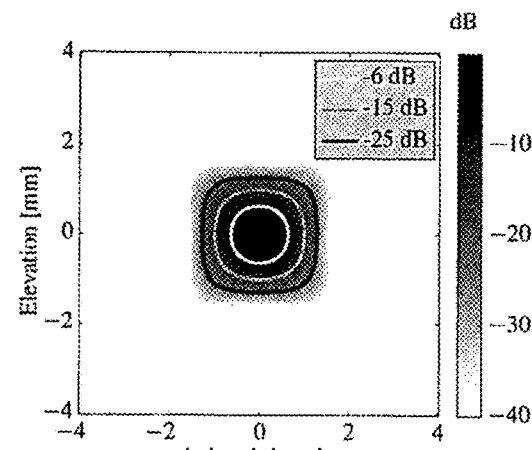
FIG. 10 depicts a point spread functions for elevation versus azimuth for traditional row-column addressing.

FIGS. 5, 6, and 7 show point spread functions (PSF's) respectively for the azimuth direction, the elevation direction, and elevation versus azimuth. In FIG. 5, a first or y-axis represents range in units of millimeters (mm) and a second or x-axis represents azimuth in the same units. In FIG. 6, a first or y-axis represent the range similar to FIG. 5, and a second or x-axis represents elevation in the same units. In FIG. 7, a first or y-axis represents elevation range and a second or x-axis represents azimuth, both in the units of millimeters. For comparative purposes, FIGS. 8, 9, and 10 show PSF's for traditional row-column addressing. In FIG. 8, a first or y-axis represents range in units of millimeters and a second or x-axis represents azimuth in the same units. In FIG. 9, a first or y-axis represent the range similar to FIG. 8, and a second or x-axis represents elevation in the same units. In FIG. 10, a first or y-axis represents elevation range and a second or x-axis represents azimuth, both in the units of millimeters. FIGS. 7 and 10 show improved spatial resolution with the approached described herein (FIG. 7) relative to traditional row-column addressing (FIG. 10).

Again, as a result of the improved resolution, the number of transmissions can be maintained to yield the full spatial resolution improvement, the number of transmissions can be reduced while still yielding improved spatial resolution, and/or the number of transmissions can be reduced to maintain a particular resolution, relative to traditional row-column addressing. To have a same lateral resolution for both fully addressed and row-column addressed 2-D arrays, the number of row or column elements on a row-column addressed array is increased. Changing the aperture size will not change the normalized amplitudes, and the side-lobe levels relative to the main lobe level. By squaring the Fourier transform of the apertures, the amplitudes of the side-lobes are halved by a factor of two in decibels (dB) when two-way focusing is performed. A measure of contrast is the side-lobe level. Therefore, the approached described herein will have superior contrast performance relative to the traditional row-column addressed 2-D array one-way focusing.

Super resolution technique using ultrasound can overcome the diffraction limit and provide enhanced visibility of vascular features. It is possible to study the micro-vasculature and thereby directly the perfusion, of tissues and tumors. The resolution of standard clinical ultrasound systems typically ranges between 50-500 μm, and even high frequency setups struggle to resolve micro-vessels with a diameter around 100 μm or less. However, it is possible to go beyond the diffraction limit when applying contrast agents consisting of gas filled microbubbles, which is disclosed in Errico et al., "*Ultrafast ultrasound localization microscopy for deep superresolution vascular imaging*", Nature, vol. 527, pp. 499-502, November 2015. Microbubbles are enhanced in ultrasound images due to their non-linear properties and strong back-scattering ability. Based on the received RF data, it is possible to locate and track individual microbubbles in 2-D when a 1-D transducer is used or in a full volume when a 2-D transducer is applied. The precision of the estimated microbubble position highly depends on the focusing performance. With two way RC focusing, as described herein, the location of the microbubble is therefore expected to be improved as well as the overall performance of mapping micro-vasculatures in a volume or a plane.

As briefly discussed above, in one non-limiting instance, the velocity processor 120 processes the beamformed row-column addressed echoes to estimate 3-D velocity components from unfocussed diverging waves in combination with synthetic aperture (SA) and directional transverse oscillation (DTO). The technique is not limited to this combination, such that focused or plane waves can be utilized in transmit and can be combined with e.g. speckle tracking, vector Doppler techniques etc. An example of this described next in connection with FIGS. 11 and 12.

In traditional synthetic aperture imaging with a 1-D array, the transmit sequence consists of several unfocused emissions, which can be either single element transmissions or multiple element transmission using virtual sources. After each transmit event, a low resolution image is beamformed by using all elements in receive. When all transmit events have been executed, the low resolution images are added together to form a high resolution image. The high resolution image is equally focused everywhere in the plane. The high resolution image can be processed to render a B-mode image, but can also be used for vector flow estimation. Patent application PCT/IB2015/051526, filed Mar. 2, 2015, and entitled "Vector velocity estimation with directional transverse oscillation," which is incorporated herein by reference in its entirety, describes an approach in which a high resolution image is obtained with synthetic aperture (SA) techniques and used to obtain the lateral velocity component in the entire plane, when directional transverse-oscillation (DTO) is applied.

The approached described herein expands this to 3-D vector flow for the 2-D row-column addressed transducer array 102, which results in high resolution volumes (HRV's). FIG. 11 shows an example data acquisition sequence for obtaining high resolution volumes with the row-column addressed array 102, which are processed by the velocity processor 120 to produce 3-D vector flow estimation in a volume. Due to the large area of each element in a row-column addressed array, enough energy from a single element emission is generated to beamform a low resolution volume. When an emission is made with a column element, all row elements are used in receive to beamform a low resolution volume, and when a row emission is made, all column elements are used in receive to beamform yet another low resolution volume. The interleaved transmit sequence consists of N emissions distributed between N/2 row emissions and N/2 column emissions. Adding all the N/2 low resolution images beamformed with the aperture containing the row elements yields the high resolution volume $HRV_{CR}$, and adding all the N/2 low resolution images beamformed with the aperture containing the column elements yields the high resolution volume $HRV_{CR}$.

As shown in FIG. 12, each of the HRV's is separated into multiple high resolution planes (HRP's), and processed by a transverse oscillation (TO) estimator to yield the lateral velocity component. An example of a suitable TO estimator is described in U.S. Pat. No. 6,148,224 A, filed Dec. 30, 2016, and entitled "Apparatus and method for determining movements and velocities of moving objects," which is incorporated herein by reference in its entirety. The TO estimator requires two TO signals as input, which need to be phase shifted by a quarter of the lateral wavelength. The TO signals can be created in the receive beamforming by changing the apodization function to contain two separated peaks. However, a lateral oscillation can also be generated in the Fourier domain, known as k-space, to provide better control over the lateral oscillation wavelength. This is accomplished by using a filter in the Fourier domain, which filters a beamformed plane in the lateral dimension to only select k-space components around a desired lateral oscillation frequency. Example approaches are described in Jensen et al., "High frame rate vector velocity estimation using plane waves and transverse oscillation," in *Proc. IEEE Ultrason. Symp.*, 2015, pp. 1-4, and Salles et al., "2-D arterial wall motion imaging using ultrafast ultrasound and transverse oscillations," *IEEE Trans. Ultrason., Ferroelec., Freq. Contr.*, vol. 62, no. 6, pp. 1047-1058, 2015.

FIG. 12 shows multiplication of the filter and the Fourier transformed plane yields a TO HRP. The plane is filtered in the lateral dimension, while the axial dimension is not filtered, or untouched. The directional information of the flow is preserved by applying a Hilbert transform on the filtered plane (spatial domain) for each of the lines in the lateral direction. The directional information of the flow could also be obtained in the Fourier domain, by setting all negative frequencies equal to 0. These two signals (the Hilbert transformed and non-Hilbert transformed signal) are now used as input to the velocity processor 120. The output of the velocity processor 120 is the 2-D vector flow information for the axial and the lateral velocity components in the entire plane. This routine is then performed on all the planes that makes up for the HRV to yield 2-D vector flow in a volume. The $HRV_{CR}$ is used to estimate the direction and the magnitude of the velocity component in the direction parallel to the column elements, and the $HRV_{RC}$ is used to estimate the axial velocity and the azimuth velocity components.

The axial velocity component can be found using a conventional autocorrelation approach or by cross correlation techniques. A suitable conventional autocorrelation approached is described in Kasai et al. "Real-Time Two-Dimensional Blood Flow Imaging using an Autocorrelation Technique," *IEEE Trans. Son. Ultrason.*, vol. 32, pp. 458-463, 1985 or Loupas et al, "An Axial Velocity Estimator for Ultrasound Blood Flow Imaging, Based on a Full Evaluation of the Doppler Equation by Means of a Two-dimensional autocorrelation approach," UFFC, 1995, vol 42, pp. 672-688. A suitable cross correlation technique is described in U.S. Pat. No. 6,725,076 B1, filed May 10, 2000, and entitled "Vector velocity estimation using directional beamforming and cross-correlation," which is incorporated herein by reference in its entirety. Other suitable correlation techniques are described in Jensen, "Directional velocity estimation using focusing along the flow direction: I: Theory and simulation," *IEEE Trans. Ultrason., Ferroelec., Freq. Contr.*, vol. 50, pp. 857-872, 2003, and Jensen et al., "Directional velocity estimation using focusing along the flow direction: II: Experimental investigation," *IEEE Trans. Ultrason., Ferroelec., Freq. Contr.*, vol. 50, pp. 873-880, 2003, and in Bonnefous et al., "Time domain Formulation of Pulse-Doppler Ultrasound and Blood Velocity Estimation by Cross Correlation", Ultrasonic Imaging 8, 73-85, 1986.

Combining the estimated axial velocity component with the lateral velocity component found from $HRV_{CR}$ and with the respective lateral velocity component found from $HRV_{RC}$ yields the 3-D vector flow information for the entire volume. Additional combinations can also be used to estimate the velocities, such that the high resolution volume can be constructed from the addition or any multiplication of $HRV_{CR}$, $HRV_{RR}$, $HRV_{CC}$, or $HRV_{RC}$.

As briefly discussed above, in one non-limiting instance, the velocity processor 120 processes the beamformed row-column addressed echoes to estimate 3-D velocity components from focused emissions in a plane and TO. An example of this described next in connection with FIG. 13.

A traditional TO velocity estimator can estimate two velocity components with data acquired with a 1-D array. Examples of such an estimator is described in Jensen et al., "A new method for estimation of velocity vectors," *IEEE Trans. Ultrason., Ferroelec., Freq. Contr.*, vol. 45, pp. 837-851, 1998, Jensen et al., "A new estimator for vector velocity estimation," *IEEE Trans. Ultrason., Ferroelec., Freq. Contr.*, vol. 48, no. 4, pp. 886-894, 2001, and Pihl et al., "A transverse oscillation approach for estimation of three-dimensional velocity vectors. Part I: Concept and simulation study," *IEEE Trans. Ultrason., Ferroelec., Freq. Contr.*, vol. 61, pp. 1599-1607, 2014, and in the patent application serial number 20160106391 A, publication number 2016/06391 A1, filed on May 5, 2013, and entitled "Three dimensional (3D) transverse oscillation vector velocity ultrasound imaging," which is incorporated herein by reference. The result is one component perpendicular to the element orientation in addition to an axial component. Three beamformed lines are needed, including one center line for the axial estimator and two steered lines for the transverse estimate. The center line $r_{center}$ is beamformed along the direction (0, 0, z), using delay-and-sum and a traditional apodization profile. For the two steered lines, a traditional TO apodization profile with two separated peaks is applied and beamforming is performed along the lines $(x, y, z)=(\pm \lambda_x (z)/8, 0, z)$ to create the $\lambda_x/4$ spatial separation.

This approach can be expanded to estimate 3-D velocities with the 2-D row-column addressed transducer array 102. The third velocity component can be obtained by applying the same procedure as for the transverse component, but this time by beamforming the two steered lines at $\pm\lambda_y/8$ in the orthogonal direction. All five lines are beamformed from two transmit events and combined afterwards. The five beamformed signals are subsequently used as input to the TO velocity estimator. From each transmit event three lines are beamformed at multiple direction. Two of the lines, $r_{left}$ and $r_{right}$, are used to estimate the velocity component perpendicular to the tallest dimension of the receiving elements using the TO method, and the third line, $r_{center}$, is used to estimate the axial velocity with an autocorrelation approach, such as that describe in Kasai et al., "Real-Time Two-Dimensional Blood Flow Imaging using an Autocorrelation Technique," *IEEE Trans. Son. Ultrason.*, vol. 32, pp. 458-463, 1985 or Loupas et al.,"An Axial Velocity Estimator for Ultrasound Blood Flow Imaging, Based on a Full Evaluation of the Doppler Equation by Means of a Two-dimensional autocorrelation approach," UFFC, 1995, vol 42, pp. 672-688. By combining the estimated transverse velocity components, one from each transmit event, with one of the two independent axial estimates, a 3-D velocity vector along the direction of the respective beamformed centerline is obtained.

The transmit sequence can either be designed to yield M-mode data, where 3-D vector flow is estimated in points along the axial $(0,0,z)$ direction, or it can be expanded to contain 3-D vector flow in a plane, when several steered emissions in one plane are added to the sequence, and finally, if steered emissions are made in two planes, 3-D volumetric flow can be obtained. The steered transmit sequence is used to estimate 3-D vector flow in the cross-sectional plane in a vessel. This sequence consists of one focused emission $C_1$ using column elements and N focused emissions $R_i$ using row elements, where i=1 . . . N. 3-D vector flow is estimated in points along the N steered directions in the zy-plane. The column emission generated a plane wave within the cross sectional zy-scan plane, whereas plane waves perpendicular to the scan plane were steered in the zy-plane when using the row elements.

Figure 13:
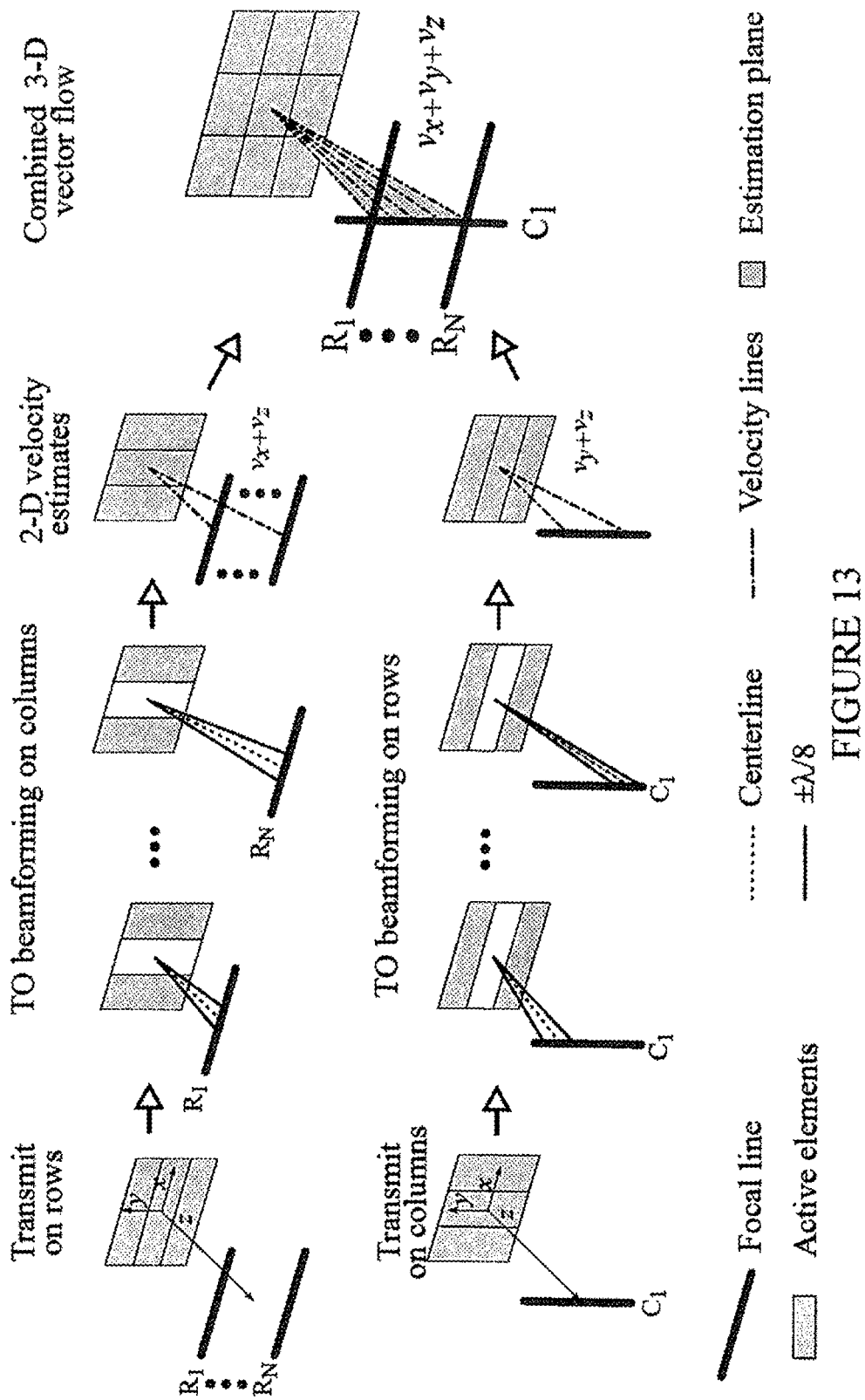

From the row transmit event $R_i$, the $v_{xi}$ and $v_{zi}$ velocity components are estimated in points along the direction of the respective beamformed centerline. However, the $C_i$ column transmit event provides the data for beamforming the lines needed for estimating all $v_{yi}$ and $v_{zi}$ velocity components, as this transmit event sonifies the zy scan plane. The steered transmit sequence used is schematically written as: $C_1 \to R_1 \to R_2 \to R_3 \to \ldots R_N$, and $C_1 \to R_1 \to R_2 \to R_3 \to \ldots R_N$. The sequence can be modified to yield volumetric 3-D vector flow, if several column emissions are added. A sequence to yield volumetric 3-D vector flow could be written as: $C_1 \to R_1 \to C_2 \to R_2 \to \ldots C_N \to R_N$ and $C_1 \to R_1 \to C_2 \to R_2 \to \ldots C_N \to R_N$. This is shown in FIG. 13.

Compared to the M-mode sequence, the steered sequence differs in two ways. First, after each column emission $C_1$, multiple steered row emissions $R_N$ are emitted. From each row emission three lines are beamformed according to the steering directions and $v_x$ and $v_z$ can be estimated along each direction. Second, from a single column emission $C_1$, three lines are beamformed along each steering direction yielding $v_y$ and $v_z$ velocity estimates along the N directions. 3-D vector flow is estimated in points along directions originating from the center of the aperture and through the intersection between the focal lines. The estimation plane is obtained when interpolating the combined 3-D vector flow estimates.

To achieve volumetric 3-D flow, TO beamforming is performed in multiple directions. TO beamforming is performed at all sites where the focal line from a row emission and a column emission are intersecting. Both sequences yield continuous data, which means that the distance between each identical emission type is equally distributed in time for all time. An advantage of continuous data is that very high frames rate can be obtained, and that dynamic ensemble lengths and any echo canceling filters can be applied. The higher obtainable frame rate with continuous data occurs, since a sliding window can be applied on the beamformed data to generate one velocity estimate. The velocity estimate can be updated from each new similar emission, since the new data can replace the oldest data in the estimator.

Figure 14:
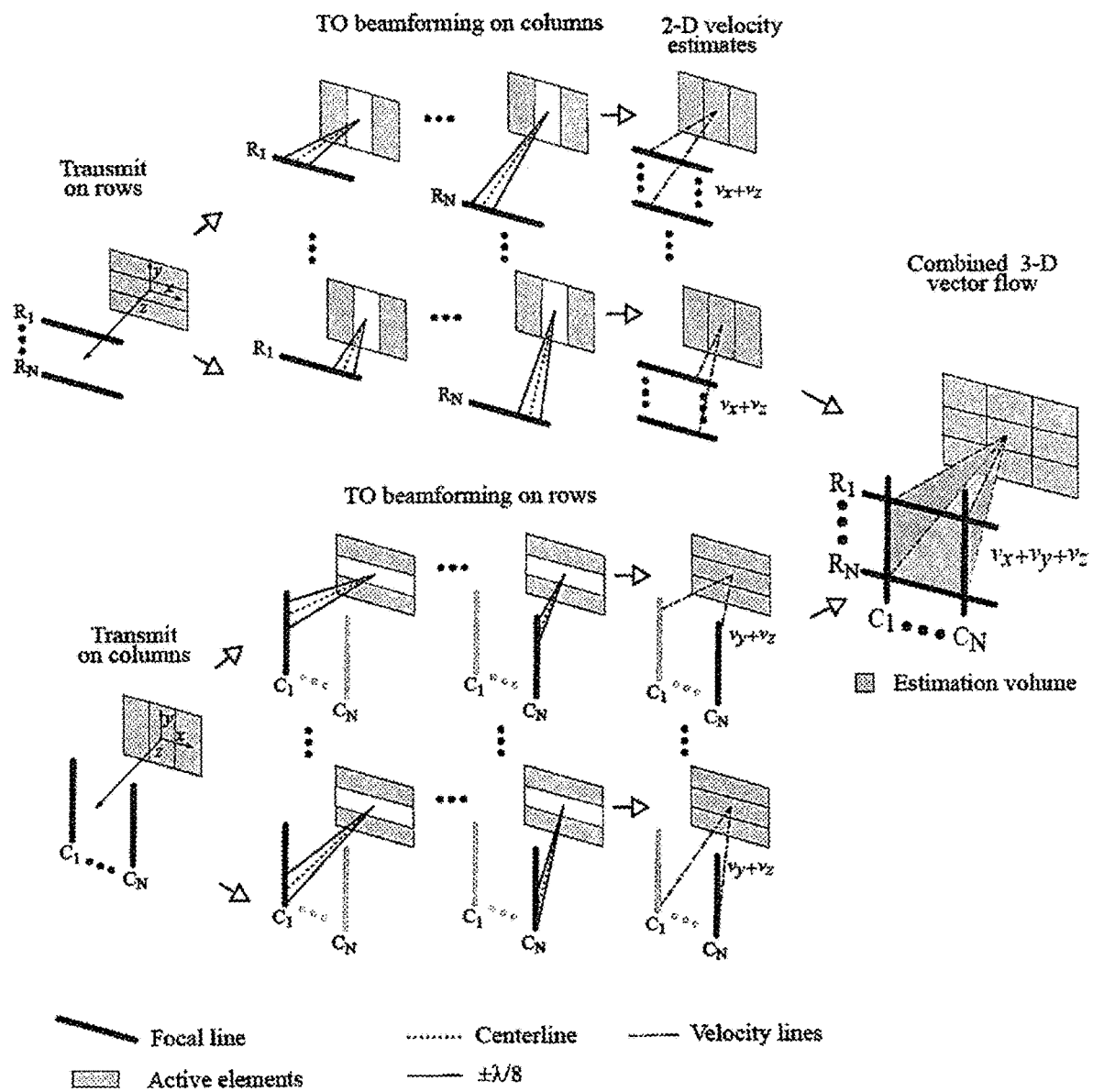

As briefly discussed above, in one non-limiting instance, the velocity processor 120 processes the beamformed row-column addressed echoes to estimate 2-D and/or 3-D velocity components in a volume using DTO. An example of this described next in connection with FIG. 14.

Compared to the single plane sequence of FIG. 13, the volumetric sequence differs in at least two ways. First, after multiple column emission $C_N$ are emitted, and second, TO beamforming is performed where ever the focal line from a row emission or a column emission are intersecting. 3-D vector flow is estimated in all points along directions originating from the center of the aperture and through the intersection between the focal lines. The estimation volume is obtained when interpolating the combined 3-D vector flow estimates. An alternative sequence could be: $C_1 \rightarrow C_1 \rightarrow R_1 \rightarrow R_1 \rightarrow \ldots C_N \rightarrow C_N \rightarrow R_N \rightarrow R_N$. This gives a high velocity range and a continuous sequence. Although the sequence becomes longer however the time difference between the two sequences for every direction becomes smaller compared to the previous sequences. This increases the maximum detectable velocity as this is given by $v_{max} = \lambda_x/(2T_{prf})$, where $\lambda_x$ is the lateral or azimuth wavelength and $T_{prf}$ is the time between measurements. Keeping $T_{prf}$ low, this, ensures a high maximum detectable velocity.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An ultrasound imaging system, comprising:
    a 2-D transducer array, including:
        a first 1-D array of one or more rows of transducing elements configured to produce first ultrasound data; and
        a second 1-D array of one or more columns of transducing elements configured to produce second ultrasound data,
        wherein the first and second 1-D arrays are configured for row-column addressing;
    a controller configured to control the first and second 1-D arrays to transmit a first ultrasound signal with the first 1-D array and receive first echoes with the first and second 1-D arrays, and subsequently transmit a second ultrasound signal with the second 1-D array and receive second echoes with the first and second 1-D arrays;
    a beamformer configured to beamform the received first and second echoes and combine the beamformed first and second echoes to produce ultrasound data with two-way focusing in an elevation direction in transmit by multiplying the beamformed first and second echoes; and
    an image processor configured to process the ultrasound data to generate an image, which is displayed via a display.

2. The ultrasound imaging system of claim 1, wherein the first and the second 1-D arrays transmit multiple unfocused emissions.

3. The ultrasound imaging system of claim 1, wherein the beamformer further combines the first and second echoes taking a square root of a product of the multiplication.

4. The ultrasound imaging system of claim 1, further including: estimating 3-D velocity components based on unfocussed diverging waves.

5. The ultrasound imaging system of claim 1, wherein the beamformer combines the beamformed first and second echoes by taking a minimum value of an absolute value of the first and second echoes at each point in space.

6. The ultrasound imaging system of claim 1, further comprising:
    a velocity processor configured to processes the beamformed data to produce 3-D vector flow volumetric imaging data.

7. The ultrasound imaging system of claim 6, wherein the controller is configured to control transmission of the first and second 1-D arrays to produce single element transmission.

8. The ultrasound imaging system of claim 7, wherein the velocity processor is configured to process the beamformed data using a synthetic aperture and a directional transverse oscillation estimator.

9. The ultrasound imaging system of claim 6, wherein the controller is configured to control transmission of the first and second 1-D arrays to produce focused steered emission sequence.

10. The ultrasound imaging system of claim 9, wherein the velocity processor is configured to process the beamformed data using a transverse oscillation estimator to estimate 3-D vector flow at least one of a plane or a volume.

11. The ultrasound imaging system of claim 9, wherein the velocity processor is configured to process the beamformed data using directional transverse oscillation to compute at least one of a 2-D in-plane or a 3-D vector flow estimate.

12. The ultrasound imaging system of claim 9, wherein the beamformer employs directional beamforming in the flow direction estimated by directional transverse oscillation.

13. The ultrasound imaging system of claim 1, further comprising:
    a diverging lens coupled to a transducing side of the 2-D transducer array.

14. The ultrasound imaging system of claim 1, wherein at least one of the first 1-D array or the second 1-D array includes a curved array.

15. The ultrasound imaging system of claim 1, wherein neither the first 1-D array nor the second 1-D array includes a lens.

16. A method, comprising:
    controlling transmission and reception of first and second 1-D arrays of a 2-D transducer array, wherein the first 1-D array includes one or more rows of transducing elements configured to produce first ultrasound data, and the second 1-D array includes one or more columns of transducing elements configured to produce second ultrasound data, wherein the first and second 1-D arrays are configured for row-column addressing, and wherein the controlling includes controlling the first and second 1-D arrays to transmit a first ultrasound signal with the first 1-D array and receive first echoes with the first and second 1-D arrays, and subsequently transmit a second ultrasound signal with the second 1-D array and receive second echoes with the first and second 1-D arrays;

beamforming the received first and second echoes and summing the beamformed first and second echoes to produce ultrasound data with two-way focusing in an elevation direction in transmit; and processing the ultrasound data to generate an image, which is displayed via a display.

17. The method of claim 16, further comprising:
processing the two-way focused data to estimate and correct for tissue motion in at least one of 1-D, 2-D or 3-D ultrasound data.

18. The method of claim 16, further comprising:
controlling the transmission to produce single element transmission or constructing a virtual source transmit; and
processing the received echoes using a synthetic aperture algorithm.

19. The method of claim 18, further comprising:
processing the data to produce super resolution imaging using micro bubbles in at least one of 1-D, 2-D or 3-D ultrasound data.

20. The method of claim 16, further comprising:
controlling the transmission to produce single element transmission or constructing a virtual source transmit; and
processing the received echoes using a synthetic aperture to produce high resolution volumes.

21. The method of claim 20, further comprising:
determining axial and lateral velocity components based on the high resolution volumes estimating flow by adding the axial and lateral velocity components.

22. The method of claim 20, further comprising:
determining axial and lateral velocity components based on the high resolution volumes
estimating flow by multiplying the axial and lateral velocity components.

23. The method of claim 20, further comprising:
estimating flow in a row direction by processing a high resolution volume of the volumes for the flow direction; and
estimating flow in a column direction by processing a high resolution volume of the volumes for the flow column.

24. The method of claim 20, further comprising:
employing directional beamforming in a flow direction estimated by transverse oscillation to refine a flow estimate.

25. The method of claim 16, further comprising:
displaying only one line in M-mode.

26. A computer readable medium encoded with non-transitory computer executable instructions which when executed by a processor causes the processor to:
control transmission and reception of first and second 1-D arrays of a 2-D transducer array, wherein the first 1-D array includes one or more rows of transducing elements configured to produce first ultrasound data, and the second 1-D array includes one or more columns of transducing elements configured to produce second ultrasound data, wherein the first and second 1-D arrays are configured for row-column addressing, and wherein the control includes controlling the first and second 1-D arrays to transmit a first ultrasound signal with the first 1-D array and receive first echoes with the first and second 1-D arrays, and subsequently transmit a second ultrasound signal with the second 1-D array and receive second echoes with the first and second 1-D arrays;

beamform the received first and second echoes and combine the beamformed first and second echoes by taking a minimum value of an absolute value of the first and second echoes at each point in space to produce ultrasound data; and process the ultrasound data to generate an image.

* * * * *